United States Patent
Sommerfeld et al.

(10) Patent No.: US 7,641,424 B1
(45) Date of Patent: Jan. 5, 2010

(54) NON-PNEUMATIC CLAMP AND DRILLING SYSTEM

(75) Inventors: Craig A. Sommerfeld, Kelley, IA (US); Scott L. Clark, Boone, IA (US)

(73) Assignee: Allen IP, Incorporated, Huxley, IA (US)

( * ) Notice: Subject to any disclaimer, the term of this patent is extended or adjusted under 35 U.S.C. 154(b) by 295 days.

(21) Appl. No.: 11/210,588

(22) Filed: Aug. 24, 2005

Related U.S. Application Data (60) Provisional application No. 60/603,976, filed on Aug. 24, 2004.

(51) Int. Cl.
*B23B 47/28* (2006.01)

(52) U.S. Cl. ..................... 408/103; 408/197; 408/99

(58) Field of Classification Search .............. 408/95, 408/103, 109, 110, 197; 294/81.51; D8/306
See application file for complete search history.

(56) References Cited

U.S. PATENT DOCUMENTS

| | | | |
|---|---|---|---|
| 343,544 A | 6/1886 | Pridmore | |
| 673,737 A | 5/1901 | Smith | |
| 842,544 A | 1/1907 | Handlan, Jr. | |
| 1,148,640 A | 8/1915 | Wehner | |
| 1,272,108 A | 7/1918 | Robb et al. | |
| 1,701,644 A * | 2/1929 | Stull ............................ | 408/8 |
| 1,954,920 A | 4/1934 | Damerell | |
| 2,269,727 A * | 1/1942 | Mead ......................... | 269/25 |
| 2,420,759 A | 5/1947 | Stelz | |
| 2,466,965 A | 4/1949 | Pitts | |
| 2,512,753 A | 6/1950 | Topham | |
| 2,625,063 A | 1/1953 | Hanson | |
| 2,629,411 A | 2/1953 | Jones | |

(Continued)

FOREIGN PATENT DOCUMENTS

DE  3120331 A1  12/1982

(Continued)

OTHER PUBLICATIONS

*Kreg Tools Catalog*, 16th Edition, Product Nos. K200 & DB50,(Jul. 2004),32 p.

(Continued)

*Primary Examiner*—Eric A. Gates
(74) *Attorney, Agent, or Firm*—North Oaks Patent Agency; Shawn B. Dempster (57) ABSTRACT

A non-pneumatic clamp and drilling system with a cabinet having a work surface with a drill bit opening. A fence rests on the work surface to guide a side surface of a workpiece. A clamp is secured to the cabinet. The clamp includes clamp pad positioned above the work surface. A drill with a collet is movably secured to the cabinet beneath and at an acute angle to the work surface. The collet can hold a drill bit such that the longitudinal axis of the drill bit is parallel to the acute angle. A handle is operatively coupled to the clamp and the drill to simultaneously move the drill collet along the longitudinal axis and move the clamp pad. By manually moving the handle, the workpiece can be secured by the clamp pad and fence when the drill collet moves toward the drill bit opening in the work surface.

21 Claims, 9 Drawing Sheets

U.S. PATENT DOCUMENTS

| | | | |
|---|---|---|---|
| 2,703,994 A | 3/1955 | Mezey | |
| 2,821,872 A | 2/1958 | Salfer | |
| 2,824,470 A | 2/1958 | Monroe | |
| 3,041,896 A | 7/1962 | May | |
| 3,060,769 A | 10/1962 | Heider | |
| 3,183,743 A | 5/1965 | ODonnell et al. | |
| 3,192,801 A * | 7/1965 | Gingras | 408/9 |
| 3,301,288 A * | 1/1967 | Norlie et al. | 144/144.1 |
| 3,447,454 A | 6/1969 | Ratz | |
| 3,452,792 A | 7/1969 | Foreman | |
| 3,698,827 A | 10/1972 | Salfer | |
| 3,954,347 A | 5/1976 | Mechalas | |
| 4,061,435 A | 12/1977 | Schmanski et al. | |
| 4,280,775 A | 7/1981 | Wood | |
| 4,537,234 A | 8/1985 | Onsrud | |
| 4,573,835 A | 3/1986 | Eckardt et al. | |
| 4,664,566 A | 5/1987 | Peddinghaus | |
| 4,749,314 A * | 6/1988 | LeBlond | 408/68 |
| 4,830,554 A | 5/1989 | Lopez | |
| 4,872,787 A * | 10/1989 | Arai et al. | 408/1 R |
| 5,036,574 A | 8/1991 | Kakimoto | |
| 5,066,171 A * | 11/1991 | Arai et al. | 408/1 R |
| 5,087,156 A * | 2/1992 | Kanaya et al. | 408/1 R |
| 5,137,235 A * | 8/1992 | Wentworth et al. | 248/124.1 |
| 5,197,527 A | 3/1993 | Namba et al. | |
| 5,404,641 A | 4/1995 | Bratten et al. | |
| 5,429,896 A | 7/1995 | Hasegawa et al. | |
| 5,553,645 A * | 9/1996 | Durney | 144/365 |
| 5,785,467 A | 7/1998 | Gardner | |
| 5,785,469 A | 7/1998 | Kamada et al. | |
| 5,807,035 A * | 9/1998 | Lewin | 408/95 |
| 5,820,317 A * | 10/1998 | Van Troba | 408/136 |
| 5,863,158 A | 1/1999 | Foshee, Jr. et al. | |
| 5,863,160 A | 1/1999 | Havener | |
| 5,888,032 A | 3/1999 | Jensen | |
| 5,961,258 A | 10/1999 | Ende et al. | |
| 6,264,407 B1 * | 7/2001 | Tinken | 408/136 |
| 6,283,684 B1 * | 9/2001 | Jarvis | 408/103 |
| 6,481,937 B1 * | 11/2002 | Sommerfeld et al. | 408/115 R |
| 6,595,728 B2 | 7/2003 | Miao | |
| 6,599,064 B1 * | 7/2003 | Robinson | 408/110 |
| 6,637,988 B1 * | 10/2003 | Park | 408/103 |
| 6,726,411 B2 * | 4/2004 | Sommerfeld et al. | 408/1 R |
| 6,857,828 B2 * | 2/2005 | Weber et al. | 408/1 R |
| 7,134,814 B1 * | 11/2006 | Park | 408/103 |
| 7,140,813 B2 | 11/2006 | Tucker | |
| 7,374,373 B1 | 5/2008 | Park | |
| 2007/0122244 A1 * | 5/2007 | Chang | 408/103 |
| 2007/0280795 A1 * | 12/2007 | McDaniel et al. | 408/115 R |
| 2007/0280796 A1 * | 12/2007 | McDaniel et al. | 408/115 R |
| 2007/0280797 A1 * | 12/2007 | McDaniel et al. | 408/115 R |

FOREIGN PATENT DOCUMENTS

| | | |
|---|---|---|
| DE | 3531988 A1 | 3/1987 |
| EP | 292712 A2 | 4/1988 |
| GB | 307668 | 3/1929 |
| GB | 2102313 A | 2/1983 |
| GB | 2243568 A | 11/1991 |
| JP | 55120910 A | 9/1980 |
| WO | WO 92/12816 | 8/1992 |

OTHER PUBLICATIONS

*Build with Precision*, Product Brochure, Kreg Tool Co.,(prior to Aug. 24, 2005),4 p.

*Production Pocket Cutter: Instruction Manual*, Part No. 904376, Porter-Cable Corporation, (2001),p. 1-21.

"Drill Press Foot Pedal", Shop Notes, Nov. 1993, pp. 8-9, vol. 2, Issue 12.

"Plate Joiner Table", Shop Notes, May 1997, pp. 16-25, vol. 6, Issue 33.

* cited by examiner

NON-PNEUMATIC CLAMP AND DRILLING SYSTEM

CROSS-REFERENCE TO RELATED APPLICATION

This application claims the benefit under 35 U.S.C. 119(e) of U.S. Provisional Application No. 60/603,976 filed on Aug. 24, 2004, which is hereby incorporated by reference in its entirety.

FIELD

The present subject matter relates generally to drilling, and, more particularly, to a one-step drilling system and methods of using same.

BACKGROUND

There are many types of machines in use today for drilling holes such as dowel holes, pocket holes, and so forth, in various types of workpieces. Pocket hole wood joinery involves joining boards by inserting a fastener at an angle through the edge of one board into the other. Such joints are commonly used for face frames, cabinet boxes, leg-to-rail joinery in chairs and tables, and so forth. Drill guides, jigs, and pocket hole boring machines are used to drill the holes through which the fasteners or pocket screws are inserted into the adjoining workpiece.

Conventional devices utilize a two-step process to manually clamp and then drill. Such a process is inconvenient and time-consuming. Additionally, such clamps do not readily accommodate common material thicknesses. Other devices utilize a one-step process, but require an expensive pneumatic air cylinder with a clamp pad. The use of pneumatics further requires a source of air, i.e., an air compressor, which adds to the inconvenience and expense.

For the reasons stated above, and for other reasons stated below which will become apparent to those skilled in the art upon reading and understanding the present specification, there is a need in the art for an improved drilling system.

SUMMARY

A non-pneumatic drilling system comprising a handle connected to an adjustable clamp and to a drill switch, wherein the adjustable clamp is not in contact with a workpiece and the drill switch is off when the handle is in a first position, further wherein the adjustable clamp is in contact with the workpiece and the drill switch is on when the handle is in a second position is described. In most embodiments, the drill switch is turned on prior to the handle reaching the second position, i.e., at some point after the handle is moved away from the first position. In one embodiment the adjustable clamp is about 0.01 to 0.2 inches above the workpiece when the handle is in the first position. In one embodiment, the second position is lower in height than the first position, and the handle moves from the first position to the second position when manually pulled in a downwardly direction. The drill switch is in electrical contact with a drill, and the drill and adjustable clamp start moving at about the same time as the handle is being moved from the first position to the second position, such that a workpiece can be clamped and drilled in one step. In one embodiment, the drill is secured at an angle of about 15 degrees to a work surface, on which the workpiece is placed.

In one embodiment, the adjustable clamp comprises a compression spring in contact with a clamp pad, and the clamp pad remains stationary on the workpiece as the compression spring applies increasing force. The system is designed so that a drill bit, which is insertable into the drill, contacts the workpiece after the clamp pad contacts the workpiece. The adjustable clamp is in contact with the workpiece and the drill bit is at its maximum depth within the workpiece when the handle is in a third position, which, in one embodiment, is lower in height than the second position, such that the handle moves from the second position to the third position when manually pulled in a downwardly direction.

In one embodiment the handle is located at an angle of about 45 degrees from the workpiece when in the third position. In one embodiment, the ratio of movement between the adjustable clamp and drill is between about 1:1 and about 1:10 as the handle moves from the first position to the third position. In most embodiments, the handle is pivotally connected to a central axis rod via a bracket, the adjustable clamp is pivotally connected to the central axis rod via a linkage arm and the drill is pivotally connected to the central axis rod with a connector. In one embodiment, the linkage arm is connected to the central axis rod with a linkage bracket, and the linkage arm comprises first and second linkage arms, wherein the first linkage arm is pivotally connected to the linkage bracket at one end and pivotally connected to the second linkage arm at an opposing end, and the second linkage arm is pivotally connected to the adjustable clamp.

In one embodiment, the system further comprises a clamping tower secured to the adjustable clamp and pivotally connected to the second linkage arm such that upward force from the first and second linkage arms is transferred to a downward clamping force on the adjustable clamp as the handle is moved in a downwardly direction. In one embodiment, guide rods connected to the drill and to a guide block secured beneath the work surface are used to guide the drill bit into the guide block and up through an opening in the work surface during drilling of the workpiece.

A pocket hole boring machine comprising a power source connected to a cabinet, the cabinet having a work surface; a clamp assembly secured to the cabinet on top of the work surface; a drill secured to the cabinet beneath the work surface, the drill electrically connected to a remote switch and pivotally connected to the clamp assembly; and non-pneumatic means for simultaneously activating the remote switch and the clamp assembly with a handle, wherein the handle, clamp assembly and drill are each connected to a central axis rod is also provided. The machine can further include, in one embodiment, a fence secured to the cabinet. The fence is used to support movable stops, such as flip-stops, although the invention is not so limited. In one embodiment, the non-pneumatic means for activating the remote switch is provided by removing contact between the linkage arm and a tab located in the switch to close the electrical circuit when the handle is manually moved away from a first position. In one embodiment, the clamp assembly is pivotally connected to the central axis rod with a linkage arm which extends beneath the work surface, and the means for activating the clamp assembly is provided by pivoting the linkage arm against a clamping tower secured to the clamping assembly when the handle is manually moved away from a first position. The clamp assembly preferably contains a compression spring which continues to apply increasing force as the handle is moved from the first position to the second position.

An adjustable clamp assembly for securing a workpiece to a work surface comprising a compression spring surrounding a spring rod, wherein the adjustable clamp assembly is adjustable in length and oriented substantially perpendicular to the workpiece with a linkage arm connected to the work surface is also provided. In one embodiment, the compression spring can be preloaded by securing a clamp pad to the spring rod. In a particular embodiment, the spring rod has a threaded end and the compression spring is preloaded by threading the clamp pad onto the spring rod. In one embodiment, the compression spring is preloaded at least about 125 $lb_f$. In one embodiment, the adjustable clamp assembly is adjustable in length with an adjusting knob securable to a fixed section, the fixed section pivotally connected to the linkage arm. In a particular embodiment, the fixed section has fixed section outer threads and the adjusting knob has adjusting knob inner threads securable to the fixed section outer threads. In one embodiment, the adjustable clamp assembly further comprises a locking knob to lock the fixed section and adjusting knob in place. The compression spring can provide up to about 0.5 inches of displacement to the clamp assembly, such as up to about 0.25 inches. In one embodiment, the compression spring provides up to about 300 $lb_f$ of force to a workpiece.

Embodiments of the invention further include a method comprising activating an adjustable clamp assembly and a remote drill switch substantially simultaneously by pulling a handle connected to the adjustable clamp assembly and the remote drill switch in a downwardly direction, wherein clamping and drilling are completed in one step without the use of compressed air. In one embodiment, the method further comprises drilling a hole in a workpiece with a drill connected to the remote drill switch, the drill having a drill bit connected thereto. In one embodiment, the method further comprises pushing the handle in an upwardly direction after the hole has been drilled. In most embodiments, the drill and adjustable clamp assembly start moving at about the same time. The drill switch is in off when the handle is in a first position. The drill switch is on when the handle is in either a lower second position or an even lower third position.

In one embodiment, the handle is a lever and the user operates the device by first positioning the material to be drilled and then pulling the lever forward. This motion activates the switch, which in turn activates the drill motor and further throws or moves the clamp assembly. The drill stroke is completed by continuing to pull on the lever and then returning the lever to its home position. Although the lever is operated manually, the automated features of the device allows the user to quickly drill holes, such as pocket holes.

Embodiments of the drilling systems and methods described herein allow a user, for the first time, to use a semi-automatic device to clamp material of variable dimensional thicknesses and drill holes, such as pocket holes, in one step without the use of a pneumatic clamping cylinder.

DETAILED DESCRIPTION

In the following detailed description of embodiments of the invention, reference is made to the accompanying drawings that form a part hereof, and in which is shown by way of illustration specific preferred embodiments in which the subject matter may be practiced. These embodiments are described in sufficient detail to enable those skilled in the art to practice them, and it is to be understood that other embodiments may be utilized and that mechanical, structural, electrical, and procedural changes may be made without departing from the spirit and scope of the present subject matter. The following detailed description is, therefore, not to be taken in a limiting sense, and the scope of embodiments of the present invention is defined only by the appended claims and their equivalents.

Figure 1:
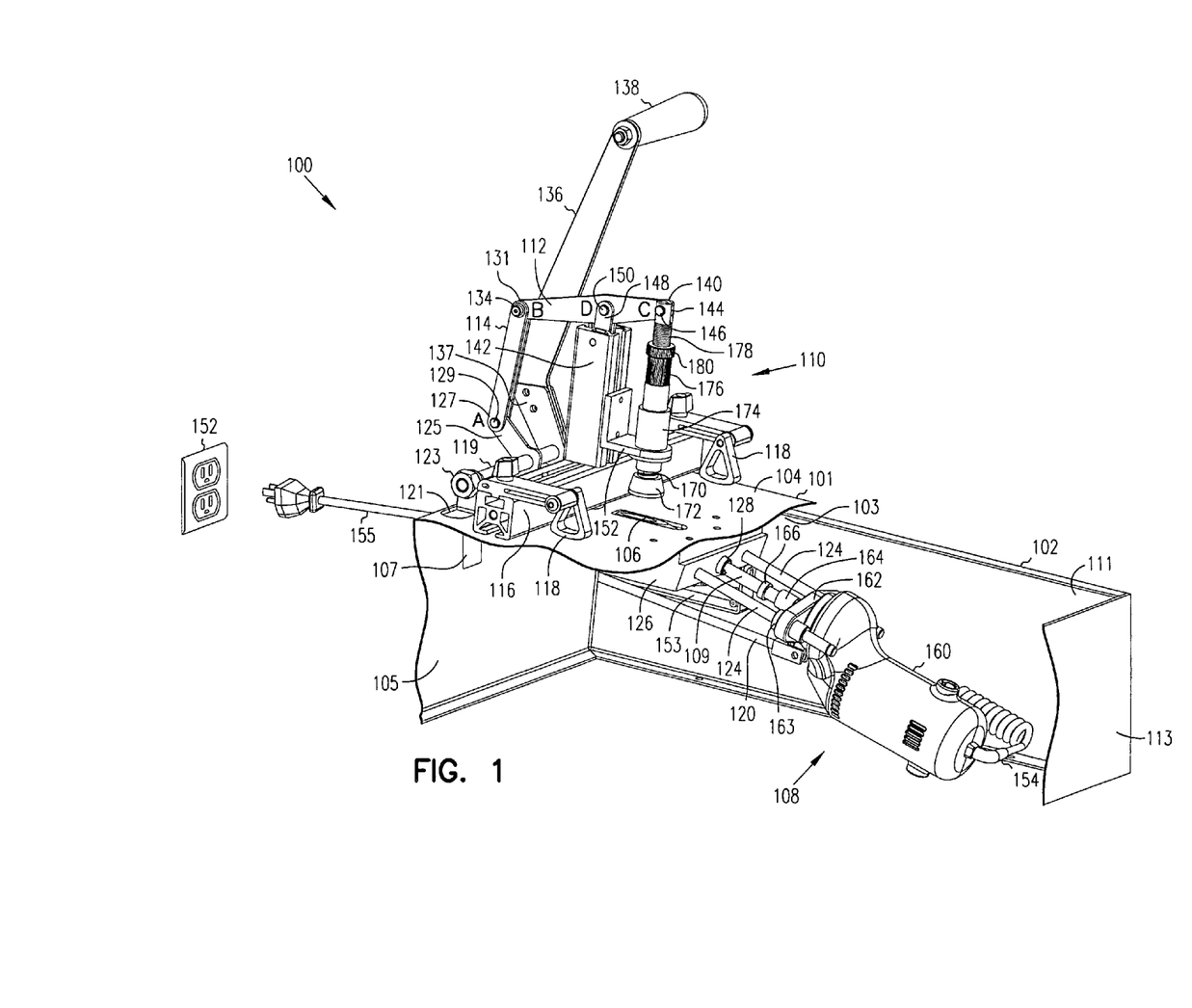
FIG. 1 is a simplified perspective view of a pocket hole drilling machine with a portion of the cabinet cut away in one embodiment of the present invention.

FIG. 1 shows one embodiment of a novel pocket hole boring machine 100. In this embodiment, the machine 100 comprises a cabinet 102 housing a drill 108 pivotally connected to an adjustable clamp, clamping cylinder or clamp assembly 110. The cabinet 102 (shown partially cut away in FIG. 1) comprises a work surface (i.e., worktable) 101, a back surface 105 with a back surface opening 107, two side surfaces 111 (one shown) and a front surface 113. In some embodiments, the cabinet 102 further comprises legs. The worktable 101 has a top surface 104, a bottom surface 103, and a drill bit opening 106. In this embodiment, the machine 100 further houses upper and lower linkage arms, 112 and 114, respectively, a fence 116 secured to top surface 104 and in communication with one or more stops 118 to guide a workpiece (not shown). Although triangular stops are shown, in practice any suitable type of stops 118 known in the art can be used. The fence 116 can be secured to the worktable 101 from the topside or underside and, in one embodiment, is movable forwards or backwards to change the position of a pocket hole from the edge of the workpiece.

The machine 100 further houses a central axis rod 119 connected to the top surface 104 with a central axis rod bracket 121 and secured in place to an opening in a central axis bracket 121 with a securing device 123, such as the nut shown in FIG. 1. A connector or connecting rod 120 connects the drill 108 to the central axis rod 119 (shown in more detail in FIGS. 2 through 4). A guide block 126 is secured to the bottom surface 103 of the worktable 101 by any suitable means, such as with threaded screws from the top. Two guide rods 124 are removably secured into guide rod openings in the guide block 126 in any suitable manner (e.g., set screws, threads, press fit, etc.) and are in substantially parallel alignment with a guide bushing 128 removably secured into bushing openings in the guide block 126 by any suitable means (e.g., set screws, threads, press fit, etc.), although the invention is not so limited. In other embodiments, no guide bushing 128 is used. However, the guide bushing 128 is useful in supporting a drill bit 109 and the two guide rods 124 during drilling, keeping them in substantially parallel alignment and minimizing deflection of the drill bit 109 as it contacts a workpiece.

Figure 2:
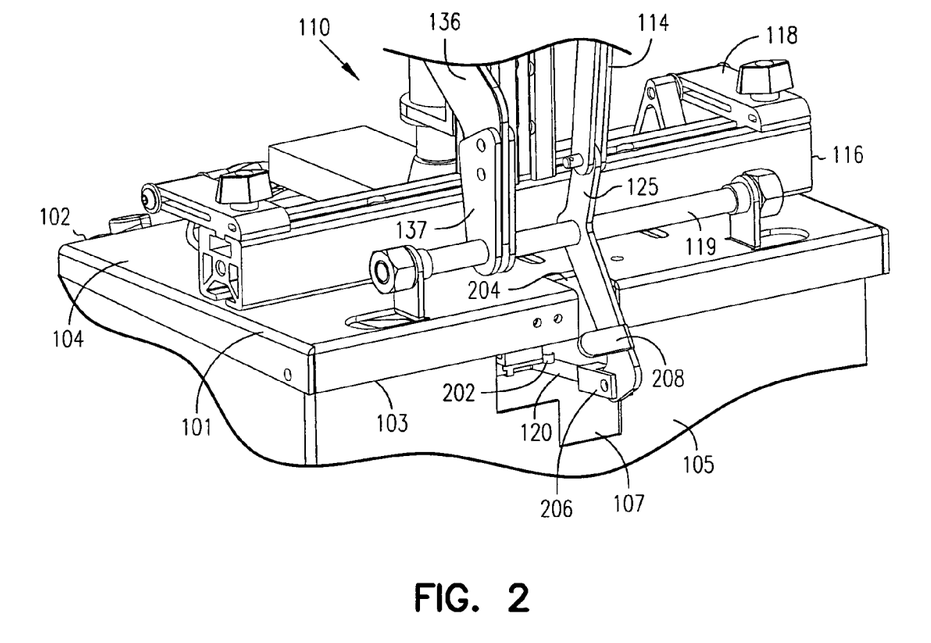
FIG. 2 is a simplified perspective view of a switch mechanism of the pocket hole drilling machine of FIG. 1 in one embodiment of the present invention.

The central axis rod 119 is in turn connected to the upper and lower linkage arms, 112 and 114, respectively, by a linkage arm bracket 125, which also extends beneath the worktable 101 (See FIG. 2). More specifically, in this embodiment, the linkage arm bracket 125 is connected to a first end 127 of the lower linkage arm at pivot point "A" with a central axis/ lower linkage pivot pin 129, while a second end 131 of the lower linkage arm 114 is connected to a first end 132 of the upper linkage arm 112 at pivot point "B" with an upper linkage/lower linkage pivot pin 134. The central axis rod 119 is also connected to a handle 136 via a handle bracket 137 as shown, the handle 136 also having a hand grip 138 secured at its opposing end as shown. In the embodiment shown in the figures, the handle 136 is a lever pivotally connected via a handle bracket 137 to the central axis rod 119, which serves as a fulcrum. Although the handle 136 is shown as movable in a downwardly direction to activate the clamp assembly 110 and switch (202) shown in FIG. 2, the invention is not so limited. In other embodiments, the handle 136 may be a lever designed to move in an upwardly direction to activate the components. In yet other embodiments, any other type of suitable handle 136 can be used. Although the connection between the handle 136 and the handle bracket 137 is at an acute angle as shown, this is provided in order to orient the handle 136 at an appropriate angle to the user and not to provide a pivot point. In other embodiments, there is no bracket 137 and the handle 136, having any suitable bend, connects directly to and pivots on the central axis rod 119. The clamp assembly 110 is connected to a second end 140 of the upper linkage arm 112 at pivot point "C" with a clamp/tower bracket 144 and clamp assembly pivot pin 146. A clamping tower 142 is connected to the upper linkage arm 112 with a clamping tower bracket 148 at pivot point "D" with a clamping tower pivot pin 150. A clamp assembly bracket 152 also fixedly secures the clamp assembly 110 to the clamping tower 142 below pivot point "D" as shown. Thus, the clamping tower 142 not only secures the clamp assembly 110 in a fixed position during use, it also provides support for pivot point "D" with the upper linkage arm 112. The clamping tower 142 therefore needs to be of a sufficient height to not only be secured to the upper linkage arm 112 at pivot point "D" but to also provide means to fix the clamp assembly 110 in place during use, such as with the clamp assembly bracket 152 shown in FIG. 1. Although the clamping tower 142 is shown attached to the fence 116, such as with a threaded bolt inserted from under the fence 116 (not shown), in other embodiments, the clamping tower 142 is located behind the fence 116, and extends to the worktable 101.

The pivot points (A-D) allow the device to operate in one smooth and continuous manner to complete a drilling operation. Additionally, pivot point "C" allows the force provided by the clamp assembly 110 to be substantially perpendicular to the top surface 104, thus minimizing the force required to perform the operation. Pivot point "D" allows for the transfer of force from an upward force provided by the upper and lower linkage arms, 112 and 114, to a downward clamping force as the handle 136 is pulled.

The clamp assembly 110 is comprised of a compression spring 170, a clamp pad 172, a clamp guide 174, an adjusting knob 176, a fixed section 178 and a locking knob 180. In the embodiment shown in FIG. 1, both the locking knob 180 and the adjusting knob 176 have a knurled outer surface which provide a raised surface to improve gripping, although the invention is not so limited. The fixed section 178 is connected to the clamp/tower bracket 144 by any suitable means, such as with a threaded connection. The adjusting knob 176 is connectable to the fixed section 178 on one end by any suitable means. In one embodiment, the adjusting knob 176 is slideable within the fixed section 178, similar to the type of adjustment mechanism found on a microscope. In another embodiment, the adjusting knob 176 screws onto the fixed section 178 (such as with threads 512 shown in FIG. 5). The adjusting knob 176 extends through the inside of the clamp guide 174 and also provides a housing or covering for the compression spring 170 on the other end (seen below the clamp assembly bracket 152). The adjusting knob 176 is used to adjust the clamp assembly 110 for variations in material thicknesses of the workpiece (not shown). In the embodiment, in which the adjusting knob 176 and fixed section 178 are screwed together, adjusting knob inner threads move up or down along outer threads of the fixed section as the adjusting knob 176 is turned within the clamp guide 174. In most embodiments, the workpiece must be at least about "⅜-inches" in thickness. Once the desired position is reached, the locking knob 180 is turned to lock the adjusting knob 176 into position, thus securing the clamp assembly 110 in place. The compression spring 170 provides desired "give" in the clamp assembly 110. Additional details about the clamp assembly 110, including the compression spring 170, are discussed in FIG. 5.

In the embodiment shown in FIG. 1, a power source 152 (such as an ac/dc current) provides power for the electric box 153 via a power cord 155. The electric box 153 is in turn electrically connected via suitable wiring 303 (shown in FIG. 3) to a switch 202 (shown in FIG. 2). The switch 202 is in turn connected to the motor 160 via a motor wire 154. In other embodiments, the power source 152 is any other suitable source of power such as batteries, and the like, further including any alternative source of renewable power. However, as it is desirable not to run the motor 160 continuously, means are preferably provided in the various embodiments to turn off the motor 160 in between drilling operations, such as with the switch 202 discussed in FIG. 2.

The drill 108 comprises a motor 160, motor bracket 162, the guide rods 124, drill bit 109, collet 164 and, preferably a stop collar 166 as shown in FIG. 1, although the invention is not so limited. It is also possible to complete the drilling operation without a stop collar 166 (See, for example, FIG. 4). As shown in FIG. 1, the drill 108 does not require any type of handle as it is activated by the user pulling down on the handle 136, such as with the hand grip 138. The collet 164 is secured to the motor 160 in any suitable manner. In one embodiment, the connection is a threaded connection. The drill bit 109 is secured to the collet 164 in any suitable manner as is known in the art, such as with a friction connection, set screws and the like. The drill 108 is secured at an angle of about 15 degrees to a workpiece in order to drill pocket holes, although the invention is not so limited. The drill 108 can be secured at any desirable angle as needed to drill any other type of hole. The motor 160 can provide any suitable amount of power. In one embodiment, the motor 160 provides anywhere from ½ hp up to 1½ hp, although the invention is not so limited. In a particular embodiment, a ¾ hp motor is used.

The guide rods 124 can extend any suitable distance into the guide block 126 and, in one embodiment, extend about one (1) to three (3) inches into the guide block 126. Although two guide rods 124 are shown, in practice any number of guide rods 124 can be used as long as the intended function is performed. The motor 160 is mounted to the motor bracket 162 in any suitable manner. In one embodiment, the connection is a threaded connection. The motor bracket 162 preferably has suitable bushings 163 (one shown) to enhance the sliding motion of the drill 108 along the guide rods 124. In one embodiment, springs (not shown) are also present on the guide rods 124 between the guide block 126 and the bushings 163 to help return the drill 108 to its initial position once the drilling is completed.

The motor 160 is designed to provide the requisite revolutions per minute (RPM) and torque required for a pocket hole drilling operation. Typically the RPM ranges from about 2200 to 2800 RPM and the torque ranges from about 50 to 75 in/lb$_f$. It is also important that the motor 160 be small enough to fit into the cabinet 102 and be able to easily move along the guide rods 124 in response to the hand grip 138 (and hence the handle 136) being pulled down by the user. In a particular embodiment, the motor is no greater than about nine (9) inches in length and no greater than about five (5) inches in diameter, although a larger motor 160 could be used, depending on the size of the cabinet 102. The motor 160 can be any suitable weight as long as it can easily slide along the guide rods 124. In one embodiment, the motor is less than about eight (8) lbs, although the invention is not so limited. In a particular embodiment, the motor is about nine (9) inches in length, about five (5) inches in diameter, providing about 2600 RPM and about 65 in/lb$_f$ of torque. In one embodiment, Groschopp, Inc., having offices in Sioux Center, Iowa, provides certain basic components for the motor 160, such as an armature, magnetic field, shaft, gears and bearings, as is known in the art, although such components are available from any number of commercial suppliers. Other components such as wiring, brushes (to transfer current and create the rotation needed for generating the appropriate RPM's) and housing can also be purchased commercially or custom made for a particular application. The housing should be designed so that the components are securely maintained in the proper position to allow the magnetic field to be substantially concentric to the armature and shaft. Additional considerations for the housing include providing proper air flow so the motor 160 does not overheat.

In one embodiment, the drill 108 is a conventional handheld drill (such as a Bosch drill made by the Bosch Power Tool Company having offices in Chicago, Ill.) with appropriate modifications to change the drill 108 from being activated by a trigger in the handle to being remotely controlled as described. In one embodiment, the drill 108 is controlled remotely with a wireless device. Alternatively, the drill can be locked in the "on" position, although most drills are not designed for continuous operation and should be turned on and off as needed. Additional design considerations involve proper mounting of the drill 108 to a bracket 162 and to the guide rods 124. In one embodiment a Bosch Model 1005VSRK ⅜" electric drill is used after appropriate modifications have been made.

Referring to FIG. 2, the motor 160 (not shown) is activated by a switch 202 secured to the bottom surface 103 with a bracket 310 (shown in FIG. 3), although the invention is not so limited. The switch 202 can be located in any suitable position and secured to the worktable 101 in any suitable manner. In one embodiment, the switch 202 is an on/off switch that is "off" only when the handle 136 is in its "home" or inactive position, i.e., the "up" position shown in FIGS. 1 and 6. Specifically, linkage arm bracket 125 extends down below the central axis rod 119, passes through an upper surface slot 204, and connects to the connecting rod 120 with a connecting rod bracket 206 below the top surface 104 of the worktable 101 as shown. The back surface opening 107 allows the components to move freely in and out of the cabinet 102 as needed. In this embodiment, the switch 202 is activated by removing contact with a tab 208, which is secured to the linkage arm bracket 125 as shown, although the invention is not so limited. Any suitable means can be used to activate the switch 202, including providing means to contact the switch 202 with a suitable device in order to activate it (versus removing contact with a component, such as the tab 208, in order to activate it). Basically, any device which allows the switch 202 to change from having an open electrical circuit (no power) to a closed electrical circuit (power) can be used.

Figure 3:
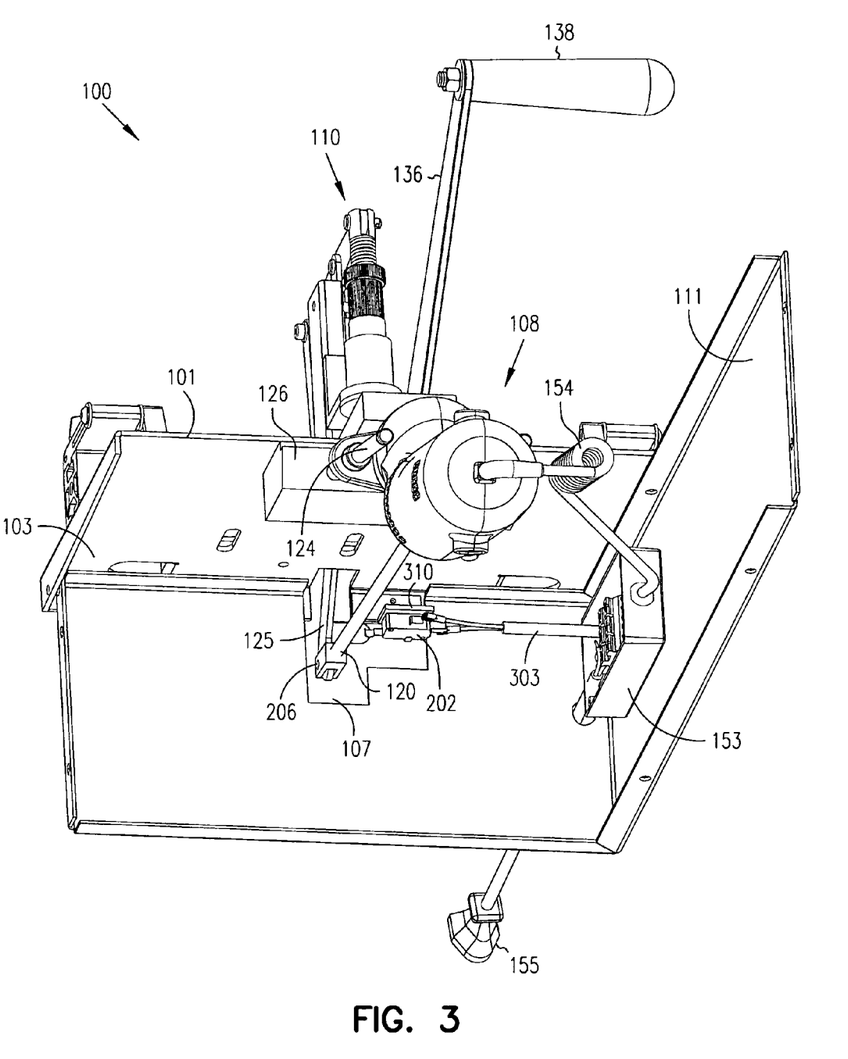
FIG. 3 is a simplified perspective view of an underside of a pocket hole drilling machine with a portion of the cabinet removed in one embodiment of the present invention.
Figure 4:
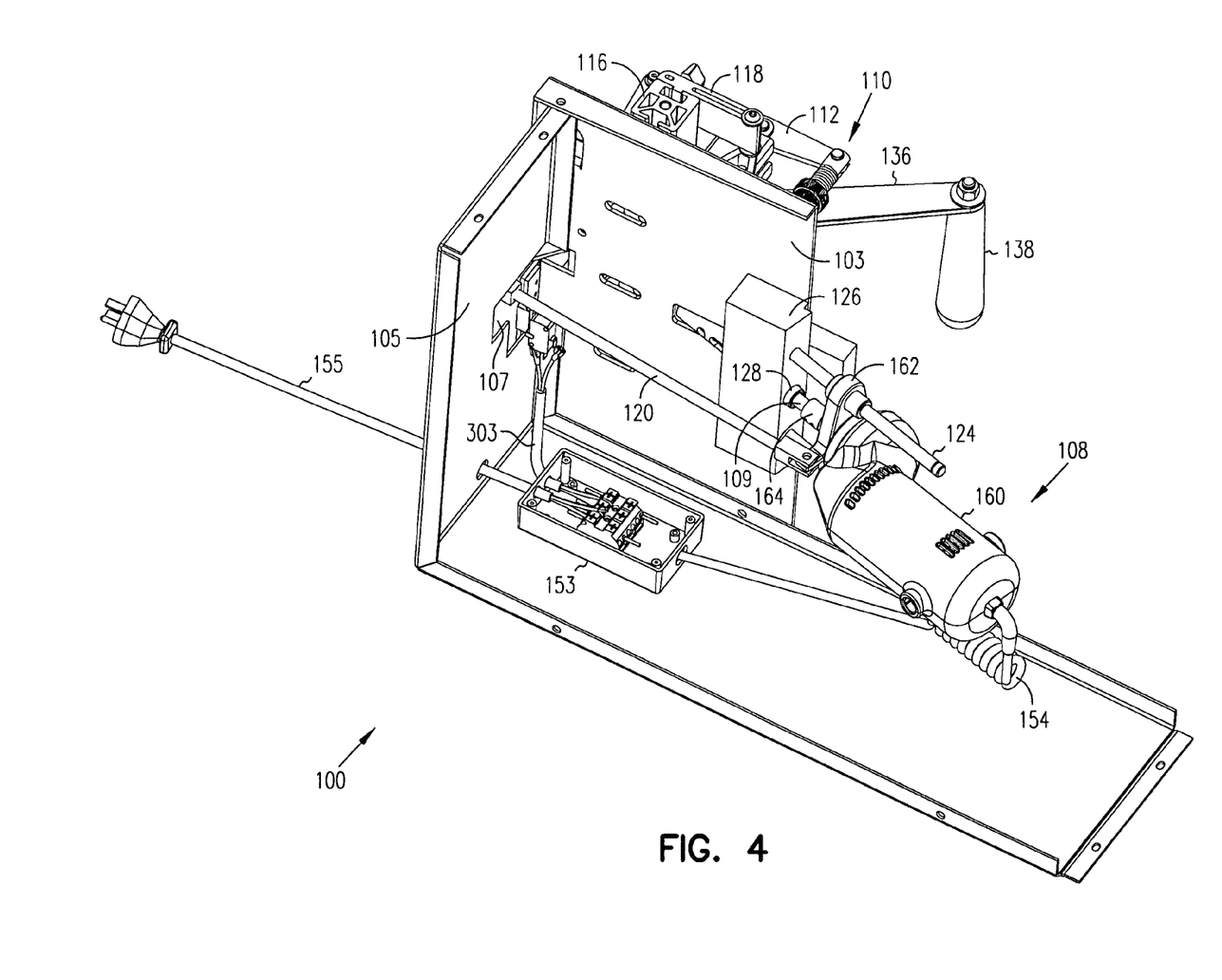
FIG. 4 is a simplified perspective view of the underside of the pocket hole drilling machine of FIG. 3 from a different perspective in one embodiment of the present invention.

In the embodiment shown in FIG. 2, the switch 202 is not depressed (closed electrical circuit) because there is no contact with the tab 208 and therefore power is running to the motor 160 (not shown), causing the motor 160 to be on. The handle 136 is therefore not in its uppermost or "home" position. Conversely, when the switch 202 is in contact with, i.e., depressed by the tab 208, the motor 160 would be off. Again, this would occur when the handle 136 is in the uppermost "home" position (See FIG. 6). As shown in FIG. 3, suitable wiring 303 is provided as is known in the art to connect the switch 202 to the electrical box 153. Suitable wiring 154 is also provided to connect the motor 160 to the electrical box 153 as previously discussed. Any suitable type of switch 202 can be used. In one embodiment, the switch 202 is a spring loaded switch which responds to pressure and removal of pressure by the tab 208. See also FIG. 4 which provides another view of the various connections underneath the worktable 101.

The various components of the pocket hole boring machine 100 can be made from any suitable materials and be of any suitable size and shape. The upper and lower linkage arms, 112 and 114, respectively, are necessarily made from materials having sufficient strength to transfer the requisite forces across their length without any bending and flexing. In one embodiment, these components are made from metal (e.g., steel or aluminum). Other materials, such as wood or plastic can be used, but would likely require substantial thickness to have the requisite strength. In one embodiment, the material is "3/16-inch" steel. In one embodiment, the force transferred through these components is greater than about 200 lb$_f$ up to about 300 lb$_f$.

In one embodiment, the upper linkage arm 112 is about four (4) to seven (7) inches in length and the lower linkage arm 114 is about three (3) to five (5) inches in length, although the invention is not so limited. The linkage arm bracket 125 can also be any suitable shape and size, and in one embodiment, the upper portion of the linkage arm bracket 125 extending from the center axis rod 119 to the first end 127 of the lower linkage arm 114) is about one (1) to three (3) inches in length and the lower portion of the bracket extending from the center axis rod 119 to the connecting rod bracket 206 is at least about two to three times longer than the upper portion. In a particular embodiment, the upper linkage arm 112 is about 5.9 inches, the lower linkage arm 114 is about 4.2 inches, the upper portion of the linkage arm bracket 125 is about 1.8 inches and the lower portion of the linkage arm bracket 125 is about 3.8 inches. In other embodiments, the lower linkage arm 114 is about the same size or larger than the upper linkage arm 114. Generally, however, the upper portion of the linkage arm bracket 125 will be shorter than the linkage arm components, 112 and 114, although the invention is not so limited.

The clamping tower 142 and fence 116, as well as the stops 118 can also be made from metal, such as steel or aluminum, wood or plastic. In embodiments in which the clamping tower 142 is secured to the fence 116 the fence 116 should be made from a material capable of withstanding the force provided by the clamping tower 142 during operation. The clamping tower 142 can also be of any suitable size and shape. In one embodiment, the clamping tower 142 is a substantially rectangular shape with a height of sufficient dimension to accommodate the height of the clamp assembly 110. In one embodiment, the clamping tower 142 has a height of sufficient dimension to provide a suitable pivot point "D" for optimum performance of the clamp assembly 110. In one embodiment, the clamping tower 142 has a height of about four (4) to seven (7) inches or more, depending on the size of the clamp assembly 110 and linkage arms 112 and 114, as well as whether or not the clamping tower 142 is secured to the fence 116 or the worktable 101. In another embodiment, the clamping tower 142 has a height of about five (5) to six (6) inches. In one embodiment, the clamping tower 142 has a width of sufficient dimension to attach the clamp assembly 110 with the bracket 152 and a depth of sufficient dimension to accommodate the pivot bracket 150, such as about one (1) to 2.5 inches. In a particular embodiment, the clamping tower 142 has a height of about 5.4 inches, and a width and depth of about 1.5 inches.

Other components, such as the guide block 126 are made from any suitable material. In one embodiment, the guide block 126 is a machined block of aluminum of any desired size and shape, as long as the intended function can be performed. In one embodiment, the guide block 126 is a rectangular piece of material about four (4) inches in length, six (6) inches in width and about 1.25 inches in height or thickness.

The handle 136, central axis rod 119, as well as the various brackets (e.g., 121, 125, 148, 152, 127 and 162) should also be made of materials having sufficient strength, such as metal such as aluminum or steel. Although wood or plastic can be used, components made from these materials are likely more bulky and/or expensive. The central axis rod 119 can have any suitable diameter and length. In one embodiment, the central axis rod 119 has a diameter of about 0.25 to 0.75 inches and a length of about six (6) to 12 inches. The handle 136 can also be any suitable size and shape. In one embodiment, the end of the handle 136 nearest the hand grip 138 is elevated about 10 to 14 inches from the worktable 101 when in the off or home position, although the actual length of the handle 136 may be greater if it has a bend, or is affixed to the handle bracket 137 at an angle as shown in FIG. 1. The hand grip 138 can further be made of any suitable material which provides an adequate grip including all of the materials mentioned as well as ceramics, rubber and the like.

The worktable 101 can also be made from any suitable material or materials, such as metal, wood or plastic, although wood or plastic surfaces need to be sufficiently thick to accept the connectors used to mount components to the worktable 101. In one embodiment, the upper surface 104 of the worktable 101 is made from at least two different types of material (See FIG. 9). In one embodiment, the worktable 101 is made from steel. In a particular embodiment, the worktable 101 is an approximately "¼-inch" stamped steel plate about 13.5 inches in length and width. In an alternative the worktable 101 is machined aluminum, although this would be more expensive than steel. The worktable 101, as well as the entire cabinet 102 can further be provided in multiple components which are secured together by any suitable means (such as the cabinet 102 shown in FIGS. 3 and 4 in which a portion of the cabinet 102 has been removed to provide a view of the components inside).

The various pivot pins can also be made from any suitable material. In one embodiment, some or all of the pivot pins are steel clevis pins. In another embodiment, some or all of the pivot pins are threaded bolts with washers and nuts which are not tightened completely so as to allow independent pivoting motion of the various components. Although use of bolts, washers and nuts are more expensive, it allows a given pivot point to pivot with very little tolerance, thus providing a "sturdy" feel to the clamp assembly 110 as compared with a conventional pin, such as a clevis pin. In one embodiment, bolts, washers and nuts are used at pivot points "B" and "D," while clevis pins are used at pivot points "A" and "C," although the invention is not so limited. As noted above, in another embodiment, pivot point "D" is replaced with a fixed connection.

Figure 5:
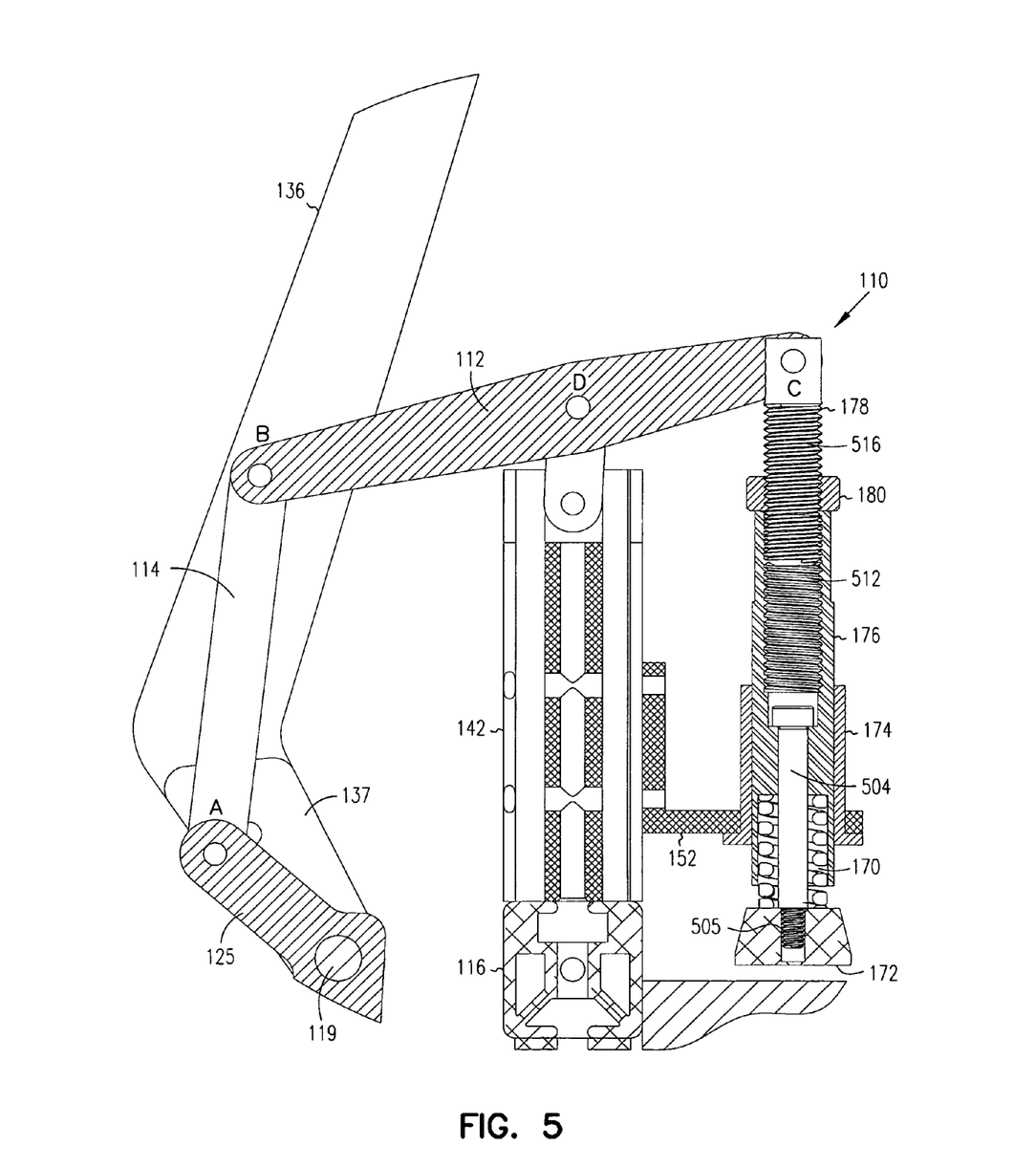
FIG. 5 is a cut-away side view of a clamp assembly, clamping tower, linkage arms and handle of the pocket hole drilling machine of FIG. 1 in one embodiment of the present invention.

As shown in FIG. 5, the clamp assembly 110 is comprised of the compression spring 170 surrounding a spring rod 504 having, in one embodiment, a threaded end 505, the clamp pad 172, the clamp guide 174, the adjusting knob 176 having, in one embodiment, adjusting knob inner threads 512, the fixed section 178 having, in one embodiment, fixed section outer threads 510 and the locking knob 180 having, in one embodiment, locking knob inner threads (not shown). As discussed herein, the compression spring 170 provides desired "give" in the clamp assembly 110, thus providing the requisite adjustability for the clamp. Specifically, the compression spring 170, which is preloaded by threading the clamp pad 172 onto the threaded end 505 prior to drilling, allows the clamp pad 172 to stop on the workpiece and maintain clamping pressure while the user is still continuing to pull on the handle 136 to complete the drilling cycle. Otherwise, once the clamp pad 172 contacts the workpiece, the drilling cycle would stop and the drill would not yet have drilled the pocket hole.

The compression spring 170 also allows a wide range of material thicknesses to be accommodated with any given position of the clamp assembly 110. In one embodiment, the compression spring 170 allows for adjustments of up to about "¹⁄₁₆-inch" in material thickness either way, for a total range of about "⅛-inch" in adjustments with any given clamp assembly position. In other embodiments, up to "¼-inch" or more of adjustability is provided. However, with adjustment levels in this range, the timing of the drill movement would need to be altered, i.e., slowed, to avoid having the drill bit 109 contact the workpiece before the clamp pad 172 does. Such adjustments can be made by adjusting the ratio of movement of the clamp assembly 110 and drill 108, which can include adding slack to delay the movement of the drill 108, as discussed below. This ability to adjust is unlike a toggle clamp which provides no range of adjustability at any given position of the clamp assembly 110. Additionally, as there is no "locking mechanism" on the clamp assembly 110 to lock the clamp pad 172 into position, the clamp pad 172 is essentially "locked" in place by the user when he continues to pull on the arm 136, thus allowing a one-step drilling operation. This is unlike conventional machines in which a conventional clamp, such as a toggle clamp, is used in one step to clamp the workpiece and a mechanical arm is used in a separate second step to activate only the drill.

The compression spring 170 is preferably a helical compression spring or a die spring made from steel and capable of withstanding between about 150 and 300 $lb_f$ with about 0.25 to 0.75 inches of deflection. In one embodiment, the compression spring 170 provides up to about 0.5 inches of displacement to the clamp assembly 110. In one embodiment, about 0.25 inches of displacement is provided. In one embodiment, the compression spring 170 is capable of withstanding up to about 300 $lb_f$ or more at about 0.33 to 0.5 inches of deflection. In one embodiment, the spring is between one (1) and four (4) inches in length and about 0.5 and one (1) inches in diameter. In a particular embodiment a die spring made by Danly IEM, having offices in Cleveland, Ohio, is used. In a particular embodiment, the spring is a Danly DieMax XL spring model no. 9-1206-26 which is about 0.75 inches in diameter, about 1.5 inches in length, capable of withstanding up to about 295.2 lb$_f$ with a maximum deflection of approximately 0.45 inches. The spring rod 504 can be any rod around which the compression spring 170 is wound. In this embodiment, the spring rod 504 is a bolt with a threaded portion 505 as shown, such as an approximately 0.3 inch diameter bolt with the threaded portion 505 having a length of about 0.3 to 0.5 inches.

Figure 6:
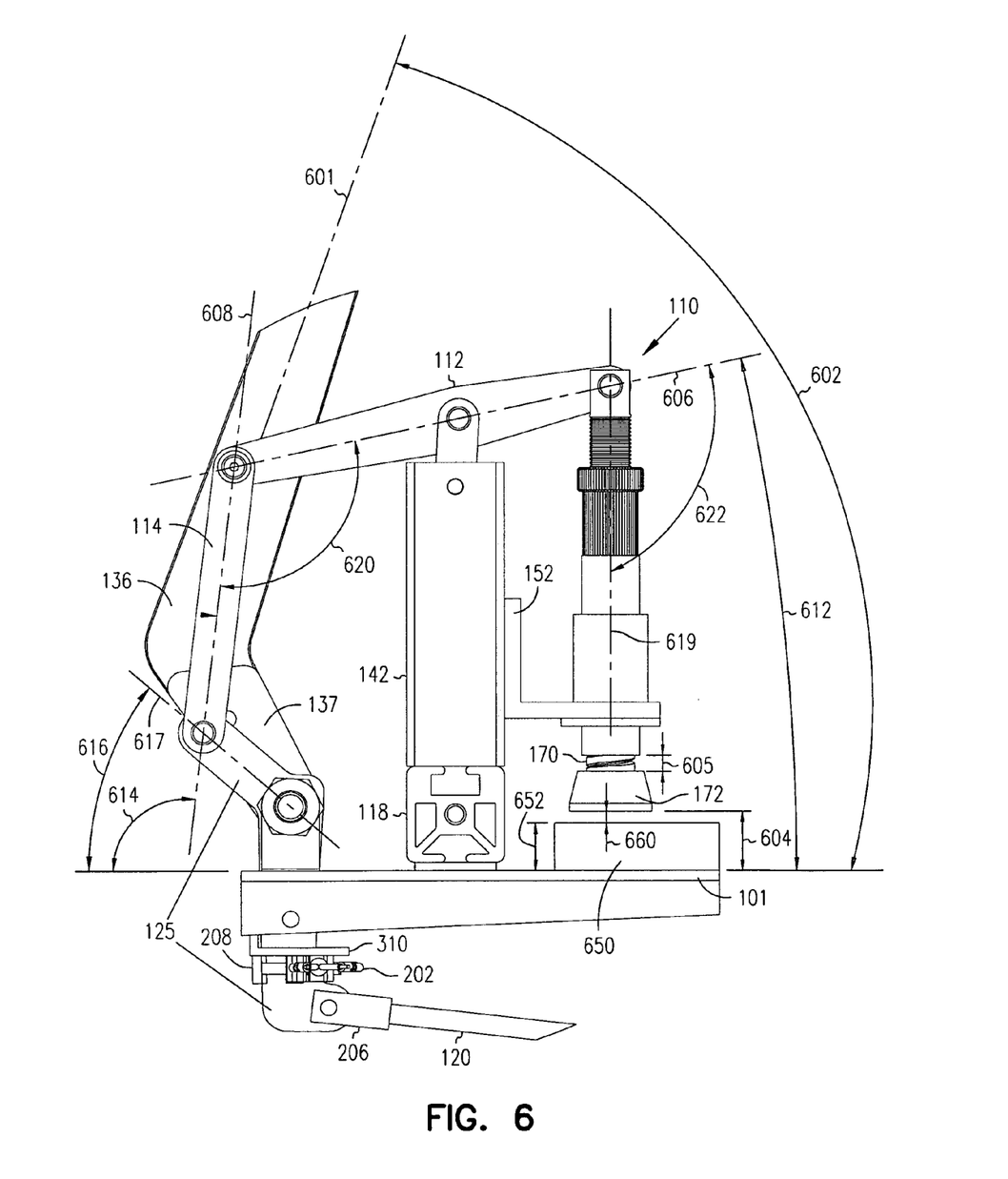
FIG. 6, FIG. 7 and FIG. 8 are side views of the clamp assembly, clamping tower, linkage arms and handle, respectively, of FIG. 1 during various stages of use; i.e., prior to clamping and drilling (FIG. 6), during first contact of the clamp assembly with a workpiece (FIG. 7), and after a pocket hole has been drilled (FIG. 8) in embodiments of the present invention.
Figure 7:
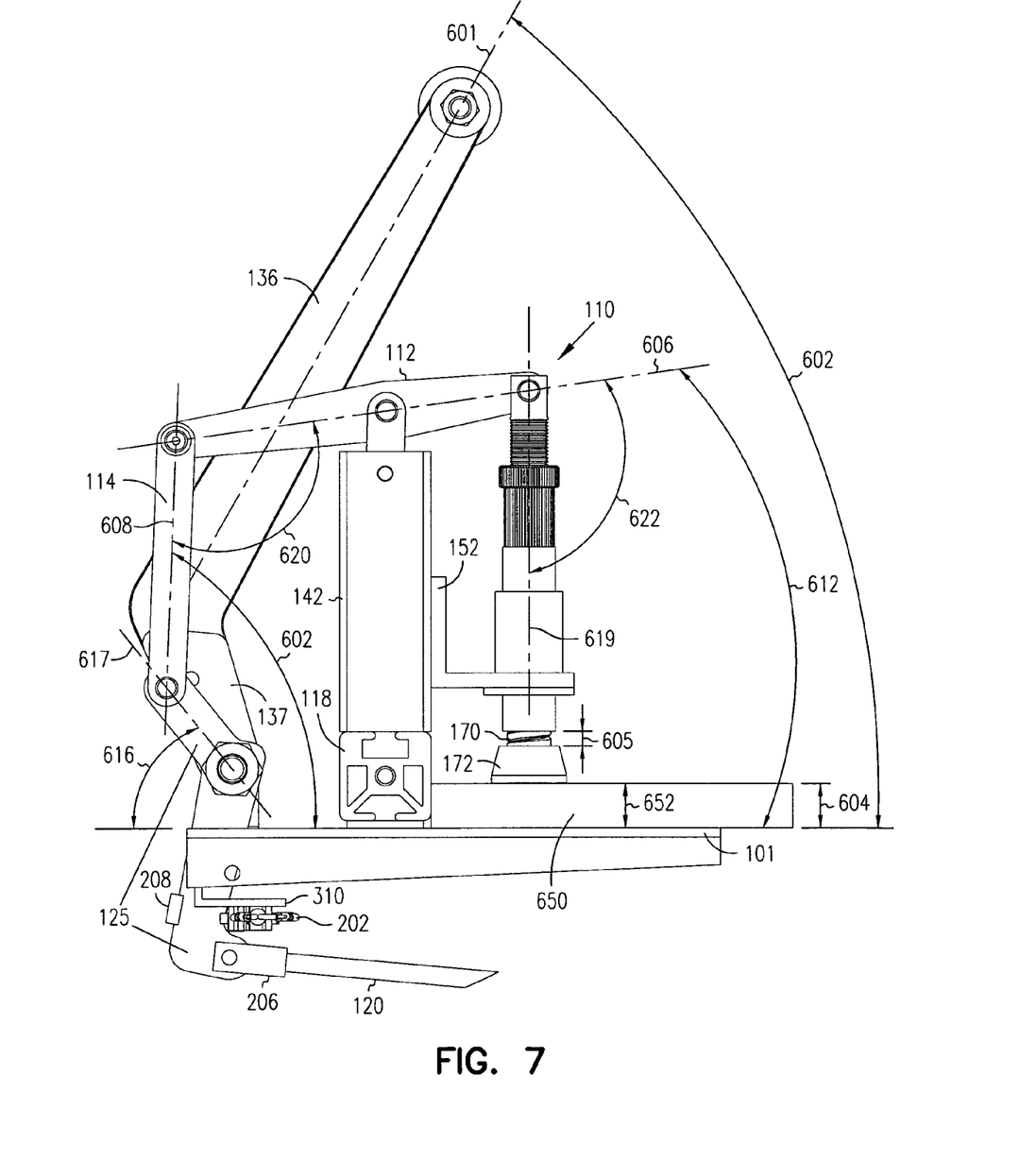
Figure 8:
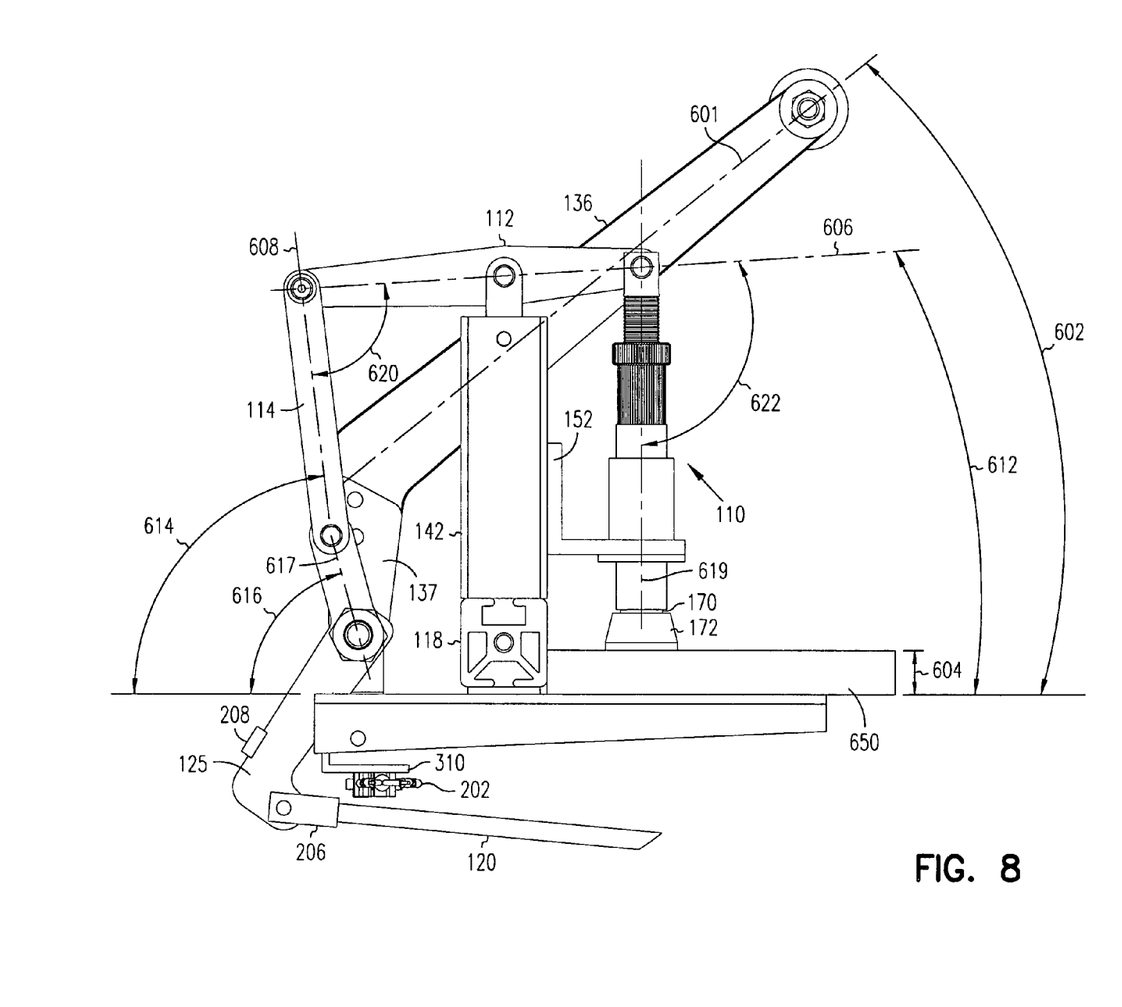

FIGS. 6-8 show the range of motion of the various components throughout a drilling cycle. FIG. 6 is in "POSITION 1" which is at the beginning of a drilling cycle and is also likely the position in which the unit is stored. As can be seen, the handle 136, having a handle centerline 601, is in an up or home position, i.e., any suitable position which allows the switch 202 to be in an off position (i.e., in this embodiment, in contact with the tab 208). In one embodiment, when the handle 136 is in the home position, the upper end of the handle 136 is at a vertical distance of about 10 to 14 inches from the worktable 101. The upper and lower linkages, 112 and 114, respectively, having centerlines 606 and 608, respectively, are also in their home positions in FIG. 6, such that the clamp assembly 110 is at its maximum distance from the worktable 101. In this position, distance 604 is about 0.75 to 1.65 inches. A workpiece 650 placed under the clamp assembly 110 has a maximum height 652 of about 0.75 inches in most embodiments, but can range from about 0.5 to 1.5 inches in height. In most embodiments, the "gap" (i.e., distance 660) between the bottom of the clamp pad 172 and the top of the workpiece 650 prior to drilling is about 0.01 to 0.18 inches, up to about 0.2 inches. In one embodiment, distance 660 is about "⅛-inch." Preferably the distance 660 is sufficiently large to allow the workpiece 650 to be inserted and removed. However, if distance 660 is too large the drill bit 109 will contact the workpiece 650 before it is fully clamped. The compression spring 170 is also subject to its minimum load at this point, having only the preload created when the clamp pad 172 is threaded onto the spring rod 506, such that distance 605 is at its maximum. In one embodiment distance 605 is between about 0.2 to 0.3 inches when the clamp assembly 110 is in an unclamped position as in FIG. 6. It is important that a sufficient amount of preload is used to prevent the drill bit from twisting the workpiece during operation. In one embodiment, a preload of between about 125 lb$_f$ and 175 lb$_f$ is used. In a particular embodiment, about 150 lb$_f$ is used.

The various components can be positioned at different angles with respect to the worktable 101 when in their home or off position, depending on their length, size of the clamp assembly 110, size of the clamping tower 112, and so forth. In one embodiment, angle 602 between the handle centerline 601 and the worktable 101 is between about 52 and 72 degrees. In one embodiment, angle 612 between the upper linkage centerline 606 and the worktable 101 is about five (5) to 15 degrees. In one embodiment, angle 614 between the lower linkage centerline 608 and the worktable 101 is about 91 to 101 degrees. In this embodiment, angle 616 between a linkage arm bracket centerline 617 and the worktable 101 is about 35 to 45 degrees. In this embodiment, angle 620 between the upper and lower linkage centerlines, 606 and 608, respectively, is about 100 to 120 degrees. In this embodiment, angle 622 between the upper linkage 112 and clamp assembly centerline 619 is about 67 to 87 degrees. In one embodiment angle 602 is about 62 degrees, angle 612 is about ten (10) degrees, angle 614 is about 96 degrees, angle 616 is about 40 degrees, angle 620 is about 110 degrees and angle 622 is about 77 degrees.

FIG. 7 is in "POSITION 2," which is after the user has pulled the handle 136 down such that a first contact with the workpiece 650 has occurred although the compression spring 170 is still at its minimum load, such that distance 605 remains the same as in FIG. 6. At this point in time the tab 208 is now no longer in contact with the switch 202 such that the motor 160 (not shown) has started. Additionally, although the compression spring 170 is still at its minimum load, the clamp assembly 110 has moved downwardly such that distance 604 has been reduced by about 0.01 to 0.1 inches (i.e., by the amount of distance 660) such that distance 604 is now the same as distance 652, i.e., the height of the workpiece 650. Additionally, the various angles between the components have changed. In one embodiment, angle 602 between the handle 136 and the worktable 101 is now about 55 to 60 degrees. In one embodiment, angle 612 between the upper linkage centerline 606 and the worktable 101 is now about three (3) to 13 degrees. In one embodiment, angle 614 between the lower linkage centerline 608 and the worktable 101 is about 87 to 97 degrees. In this embodiment, the angle 616 between the linkage arm bracket centerline 617 and the worktable 101 is about 47 to 57 degrees. In this embodiment, angle 620 between the upper and lower linkage centerlines, 606 and 608, respectively, is about 90 to 110 degrees. In this embodiment, angle 622 between the upper linkage 112 and clamp assembly centerline 619 is between about 72 to 92 degrees. In one embodiment angle 602 is about 57.5 degrees, angle 612 is about eight (8) degrees, angle 614 is about 92 degrees, angle 616 is about 52 degrees, angle 620 is about 100 degrees and angle 622 is about 82 degrees.

FIG. 8 shows the various components in "POSITION 3," which is after the user has pulled down the handle 136 a maximum distance, i.e., to an angle of about 45 degrees from the worktable 101 (although the invention is not so limited), and the drilling operation has just completed. The tab 208 remains pulled away from the switch 202 such that the motor 160 (not shown) is still running. At this point the compression spring 170 in the clamp assembly 110 is at its maximum compression and the various angles between the components have further changed. In one embodiment, angle 602 between the handle 136 and the worktable 101 is now about 35 to 40 degrees. In one embodiment, angle 612 between the upper linkage centerline 606 and the worktable 101 is now about zero (0) to ten (10) degrees. In one embodiment, angle 614 between the lower linkage centerline 408 and the worktable 101 is now about 78 to 88 degrees. In this embodiment, angle 616 between the linkage arm bracket centerline 617 and the worktable 101 is about 70 to 80 degrees. In this embodiment, angle 620 between the upper and lower linkage centerlines, 606 and 608, respectively, is about 76 to 96 degrees. In this embodiment, angle 622 between the upper linkage 112 and clamp assembly centerline 619 is between about 76 to 96 degrees. In one embodiment angle 602 is about 37.5 degrees, angle 612 is about five (5) degrees, angle 614 is about 83 degrees, angle 616 is about 75 degrees, angle 620 is about 86 degrees and angle 622 is about 86 degrees.

At this point in time, the user would push up on the handle 136 causing the components to return to the home position shown in FIG. 6, which in turn causes the motor 160 (not shown) to turn off due to the breaking of the circuit in the switch 202, which, in this embodiment, is caused by the tab 208 again contacting the switch 202.

As long as the clamp assembly 110 is holding the workpiece 650 in place during the entire drilling operation, the ratio of the movement of the clamp assembly 110 and drill 108 can vary widely. In one embodiment, such as the embodiment described in FIGS. 6-8, pulling the handle 136 forward to an angle of approximately 45 degrees with the worktable 101 causes the clamp assembly 110 and drill 108 to move in a ratio of about 1:6. In another embodiment, the ratio is less than 1:6 down to about 1:1 and in yet other embodiments the ratio is greater than 1:6 up to about 1:10. With a ratio of about 1:1, the handle 136 would likely be longer than with a higher ratio (as handle length affects the amount of travel in the clamp assembly 110) and distance 604 would be much greater than shown in FIG. 6. In most embodiments, the drill 108 begins its forward movement at substantially the same time the clamp assembly 110 begins moving, but the timing is such that the clamp pad 172 contacts the workpiece 650 before the drill bit 109 does. (In some instances it may be necessary to make adjustments in timing of drill movement to ensure the clamp contacts the workpiece prior to the drill bit. For example, additional slack can be created in movement of the drill 108, such as with a chain linkage between the linkage arm bracket 125 and the connecting rod bracket 206). Once the clamp pad 172 contacts the workpiece 650, it stops moving while the rest of the clamp assembly 110 continues to compress the compression spring 170 further until drilling is complete. In embodiments which use a stop collar 166, drilling is complete when the stop collar 166 contacts the guide bushing 128, thus preventing any further advancement of the clamp assembly 110 and drill bit 109.

In one embodiment, the clamp assembly 110 travels about 0.25 inches (distance 660) while the drill 108 travels about two (2) inches, such that the ratio of travel between the clamp assembly 110 and the drill 108 is about 1:8. Changing distance 660 will change the ratio of the movement of the clamp assembly 110 and drill 108. It is also important to note that the movement of the clamp assembly 110, not including the clamp pad 172, will always be constant regardless of the type of compression spring 170 used. However, the movement of the clamp pad 172 in relation to the drill 108 is dependent on the type of compression spring 170 used. In fact, use of other types and sizes of compression springs 170 can cause this ratio to vary between about 1:4 up to 1:10. The higher the ratio, the more force is applied to the workpiece 650 by the clamp assembly 110 at the beginning of a drilling operation. It is particularly important to have a sufficient amount of force at the beginning of the drilling operation as the drill 108 starts to enter the workpiece 650 because the drill bit 109 has a tendency to move the workpiece 650 as it rotates and contacts the workpiece 650. Once the drill bit 109 has entered the workpiece 650 this tendency is lessened. However, the device described herein allows sufficient clamping force to be maintained on the workpiece 650 throughout the drilling operation.

In most embodiments, components are sized appropriately to provide optimum clamping pressure during all phases of the drilling cycle, with least resistance to the user. In a particular embodiment, the compression spring 170 is about 1.5 inches in length, and compressed to about 1.25 inches in length prior to beginning the drilling operation, thus giving the compression spring 170 (and therefore the clamp assembly 110) a preload of about 164 $lb_f$. As the drilling operation progresses and the clamp assembly 110 bears down on the workpiece 650, the compression spring 170 travels, in one embodiment, another 0.25 inches, for a total of about 0.5 inches total deflection, providing a load of about 328 $lb_f$, although, again, the invention is not so limited. It is important to note that the shorter the distance the compression spring 170 needs to travel, the less force is required by the user to operate the device 100.

Figure 9:
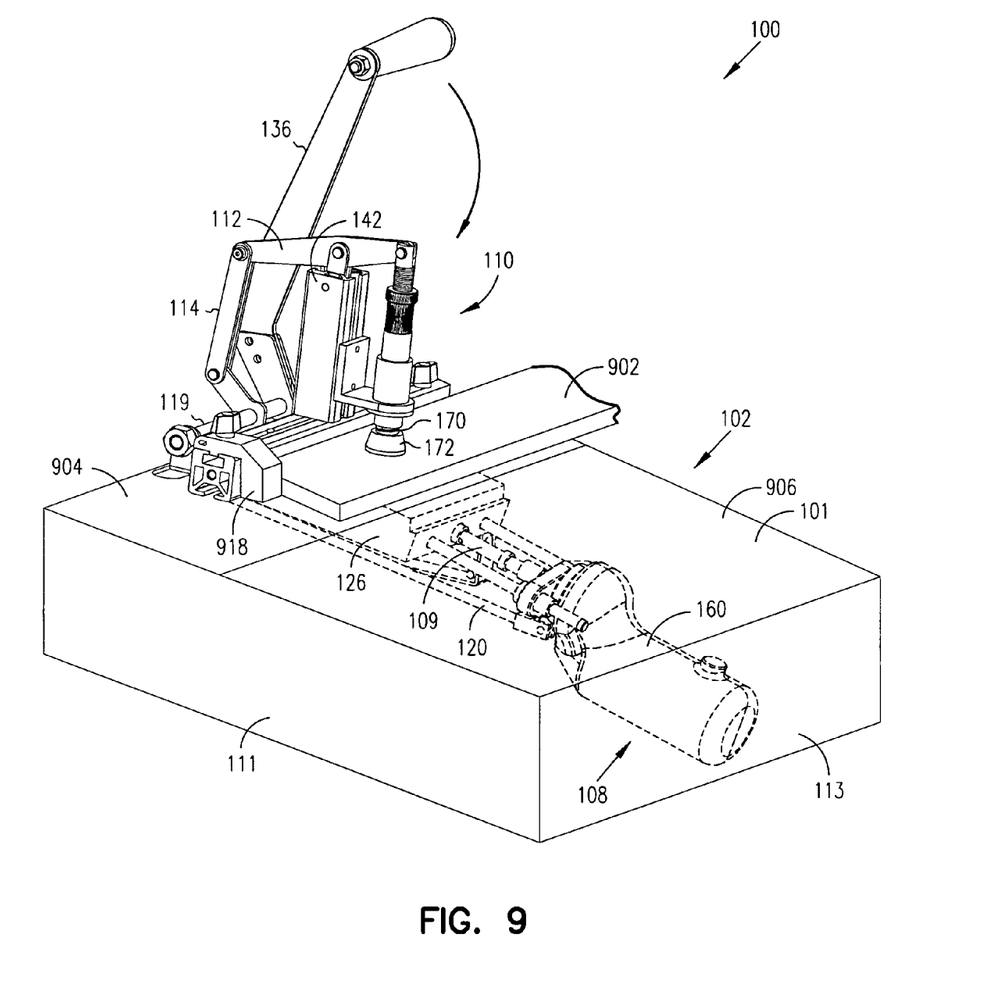
FIG. 9 is a simplified perspective view of a pocket hole drilling machine in one embodiment of the present invention.

FIG. 9 shows a simplified perspective view of a pocket hole drilling machine 100 in one embodiment of the present invention. In this embodiment, the entire cabinet 102 can be seen as described herein. Such a unit, having, in one embodiment, a height of between about six (6) and eight (8) inches, is useful for placement on a table or work surface, although, as noted above, the unit can be made as a floor model, and, in some embodiments, can include legs. The machine 100 shown in FIG. 9 has the handle 136 in the up or "1" position, such that the clamp pad 172 is not in contact with the workpiece 902. Once the handle 136 is pulled in the downwardly direction, as indicated, the clamp pad 172 will move down towards to contact the workpiece 902 as the drill 108 moves forward, allowing the drill bit 109 to then make contact with and ultimately drill a hole in the workpiece 902. The clamp pad 172 is then released when the user pushes the handle 136 back up into the position shown. FIG. 9 also shows an alternative stop 918 which can be used, although, again, the invention is not so limited. Any suitable type of stop can be used. The worktable 101 in this embodiment is divided into two sections, 904 and 906, each made from a separate type of material. In one embodiment, 904 is any type of steel or aluminum and 906 is different type of steel or aluminum or any type of rubber, wood or plastic. In a particular embodiment, section 904 is made from zinc plated mild steel and section 906 is made from an acrylic material.

Referring again to FIGS. 1 and 6-8, in use, a user grabs the hand grip 138 and starts pulling the handle 136 towards himself in a downwardly direction. This causes the upper and lower linkage arms, 112 and 114, respectively, to move up and toward the user, allowing the clamp assembly 110 to move down on top of a workpiece 650 as discussed herein. Completing the pull of the handle 136 sends appropriate clamping pressure down on the workpiece 650, such as about 200 to 300 $lb_f$ as discussed, holding it securely to the worktable 101. Although higher clamping pressures could be used, pressures greatly in excess of 300 $lb_f$ likely could become excessive and only increase the work for the user. This action simultaneously pulls the drill 108 via the connecting rod 120 along the guide rods 124 sending the drill bit 109 up through the drill bit opening 106 (and optionally through a guide bushing 128) and into the workpiece 650.

Embodiments of the invention further comprise a method comprising activating an adjustable clamp assembly and a remote drill switch substantially simultaneously by pulling a handle connected to the adjustable clamp assembly and the remote drill switch in a downwardly direction, wherein clamping and drilling are completed in one step without the use of compressed air. In one embodiment, the method further comprises drilling a hole in a workpiece with a drill connected to the remote drill switch, the drill having a drill bit connected thereto. In one embodiment, the method further comprises pushing the handle in an upwardly direction after the hole has been drilled. In most embodiments, the drill and adjustable clamp assembly start moving at about the same time. The drill switch is in off when the handle is in a first position. The drill switch is on when the handle is in either a lower second position or an even lower third position.

The semi-automatic system described herein provides a user, for the first time, with the ability to clamp and drill in a single step without the need for any compressed air, i.e., a non-pneumatic system. The compression spring within the adjustable clamp provides versatility in the thicknesses of boards which can be drilled at a given clamp setting, although adjustments to the length of the clamp can easily be made with an adjusting knob. The movement of the drill in relation to the handle can further be adjusted to provide for varying ratios of movement. This provides for even greater differences in material thicknesses which can be used without the need to adjust the clamp. However, some adjustments in timing of drill movement to ensure the clamp contacts the workpiece prior to the drill bit may be necessary as discussed herein. The result is a precision drilled hole made quickly, conveniently and economically.

Although specific embodiments have been illustrated and described herein, it will be appreciated by those of ordinary skill in the art that any arrangement that is calculated to achieve the same purpose may be substituted for the specific embodiment shown. For example, the systems and methods described herein could also be used to drill other types of holes such as dowel holes. Additionally, the machine described herein could be altered for use as a line boring machine, or even as a sawing machine, by replacing the drill with a suitably-sized saw. This application is intended to cover any adaptations or variations of the present subject matter. Therefore, it is manifestly intended that embodiments of this invention be limited only by the claims and the equivalents thereof.

What is claimed is:

1. A non-pneumatic clamp and drilling system comprising:
a cabinet having a work surface with a drill bit opening;
a fence movably secured to the work surface and operatively configured to guide a side surface of a workpiece;
a clamp assembly secured to the cabinet, the clamp assembly including a clamp pad positioned above the work surface and movable in a direction substantially perpendicular to the work surface so that the clamp can selectively engage a top surface of the workpiece;
a drill movably secured to the cabinet beneath and at an acute angle to the work surface, the drill having a collet operatively configured to accept and hold a drill bit having a longitudinal axis substantially parallel to the acute angle; and
a handle operatively coupled to the clamp assembly and the drill to simultaneously move the drill collet along the longitudinal axis and to move the clamp pad in the direction substantially perpendicular to the work surface by manually moving the handle so that the workpiece can be secured by the clamp pad and fence when the drill collet is moved towards the drill bit opening in the work surface.

2. The system of claim 1 further comprising a drill switch that operates the drill and wherein:
the clamp pad is not in contact with the workpiece and the drill switch is off when the handle is in a first position; and
the clamp pad is in contact with the workpiece when the handle is in a second position and the drill switch is turned on before the handle reaches the second position; and
the handle is operatively configured to move from the first position to the second position when manually moved.

3. The system of claim 2 wherein the drill switch is in electrical contact with the drill, and the drill collet and clamp pad move at about the same time as the handle is moved from the first position to the second position whereby the workpiece can be clamped and drilled in one step.

4. The system of claim 2 wherein the drill switch is activated by removing contact between a linkage arm and a tab located in the switch to close the electrical circuit when the handle is manually moved.

5. The system of claim 1 wherein the clamp assembly comprises a compression spring in contact with the clamp pad such that the clamp pad remains stationary on the workpiece as the compression spring applies increasing force as the handle moves the drill collet.

6. The system of claim 1 wherein the drill comprises the drill bit and is operatively configured such that the clamp pad contacts the workpiece before the drill bit contacts the workpiece.

7. The system of claim 5 wherein the clamp pad is in contact with the workpiece and the drill bit is at its maximum depth within the workpiece when the handle is in a third position.

8. The system of claim 7 wherein the handle is operatively configured to move from the second position to the third position when manually moved.

9. The system of claim 1 wherein the handle is pivotally connected to a central axis rod with a handle bracket and the clamp assembly is pivotally connected to the central axis rod with a linkage arm.

10. The system of claim 9 wherein the linkage arm is connected to the central axis rod with a linkage bracket, further wherein the linkage arm comprises first and second linkage arms, wherein the first linkage arm is pivotally connected to the linkage bracket at one end and pivotally connected to the second linkage arm at an opposing end, and the second linkage arm is pivotally connected to the clamp assembly.

11. The system of claim 10 further comprising a clamping tower pivotally connected to the second linkage arm wherein upward force from the first and second linkage arms is transferred to a downward clamping force on the clamp assembly as the handle is moved in a downwardly direction.

12. The system of claim 11 wherein the clamping tower is further movably secured to the clamp assembly.

13. The system of claim 1 wherein the drill is secured at an angle of about 15 degrees to the work surface such that the system comprises a pocket hole boring machine.

14. The system of claim 1 further comprising guide rods operatively coupled to the drill and to a guide block secured beneath the work surface, the guide rods being operatively configured to guide the drill bit into the guide block and up through the drill bit opening during drilling of the workpiece.

15. The system of claim 1 wherein the fence comprises movable stops secured thereto.

16. The system of claim 1 wherein the clamp assembly comprises a compression spring surrounding a spring rod.

17. The system of claim 16 wherein the compression spring can be preloaded by securing the clamp pad to the spring rod.

18. The system of claim 1 wherein the clamp assembly is operatively configured to be adjustable in length by utilizing an adjusting knob securable to a fixed section.

19. The system of claim 18 further comprising a locking knob for locking the fixed section and adjusting knob in place.

20. The system of claim 1 wherein the handle is pivotally connected to a central axis rod with a handle bracket and the drill is pivotally connected to the central axis rod with a connector.

21. The system of claim 1 further comprising a guide rod operatively coupled to the drill and to a guide block secured beneath the work surface, the guide rod being operatively configured to guide the drill collet along the longitudinal axis of the drill bit upon movement of the handle.

* * * * *